United States Patent
Petry-Johnson et al.

(10) Patent No.: US 8,800,517 B2
(45) Date of Patent: Aug. 12, 2014

(54) CAM SHAFT/CAM GEAR ASSEMBLY AND THRUST STRATEGY FOR ENGINE USING SAME

(75) Inventors: Travis Thomas Petry-Johnson, Peoria, IL (US); Philip Christopher Millward, Novi, MI (US); Ryan Michael Heinbuch, Novi, MI (US); Jonathan Chittenden, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 751 days.

(21) Appl. No.: 12/957,973

(22) Filed: Dec. 1, 2010

(65) Prior Publication Data

US 2012/0138009 A1 Jun. 7, 2012

(51) Int. Cl.
*F01M 1/06* (2006.01)

(52) U.S. Cl.
USPC .................. 123/90.34; 123/90.31; 123/90.33

(58) Field of Classification Search
USPC ........... 123/90.31, 90.6, 90.27, 195 R, 90.13, 123/90.17, 90.1, 196 R, 90.12, 90.34, 90.15
See application file for complete search history.

(56) References Cited

U.S. PATENT DOCUMENTS

| | | |
|---|---|---|
| 2,893,514 A | 7/1959 | Badertscher et al. |
| 4,915,066 A | 4/1990 | Koshimoto et al. |
| 5,826,461 A | 10/1998 | Kaywood et al. |
| 5,948,973 A | 9/1999 | Fujii et al. |
| 6,305,242 B1 | 10/2001 | Smith et al. |
| 6,755,172 B2 | 6/2004 | Neubock et al. |
| 6,786,643 B2 | 9/2004 | Hada et al. |
| 7,036,473 B1 * | 5/2006 | Goracy ...................... 123/90.27 |
| 2010/0288217 A1 | 11/2010 | Stolk et al. |

FOREIGN PATENT DOCUMENTS

| | | |
|---|---|---|
| DE | 19958629 A1 | 6/2001 |
| EP | 1471213 | 10/2004 |
| EP | 2177723 A1 | 4/2010 |
| JP | 11315708 A | 11/1999 |
| JP | 2005030310 A | 2/2005 |
| JP | 03997571 B2 | 10/2007 |
| JP | 2010077910 A | 4/2010 |

* cited by examiner

*Primary Examiner* — Thomas Denion
*Assistant Examiner* — Daniel Bernstein
(74) *Attorney, Agent, or Firm* — Leill & McNeil

(57) ABSTRACT

An engine includes a camshaft supported in a housing for rotation about an axis of rotation. A cam gear is attached to one end of the camshaft and includes a first thrust bearing surface. A thrust ring is attached to the cam gear and includes a second thrust bearing surface. A thrust ring retainer is attached to the housing with a plurality of bolts and includes a pair of thrust surfaces trapped between the first thrust bearing surface of the cam gear and a second thrust bearing surface of the thrust ring. The thrust ring retainer also defines a portion of a lubrication connection passage that facilitates pressure equalization among a plurality of lubrication galleries arranged in parallel adjacent the camshaft.

19 Claims, 4 Drawing Sheets

CAM SHAFT/CAM GEAR ASSEMBLY AND THRUST STRATEGY FOR ENGINE USING SAME

TECHNICAL FIELD

The present disclosure relates generally to a thrust bearing strategy for a camshaft of an engine that is attached to a cam gear, and more particularly to maintaining a camshaft in an engine housing with thrust bearing surfaces on a cam gear and an attached thrust ring, respectively.

BACKGROUND

Most internal combustion engines utilize a rotating camshaft to open and close intake valves, exhaust valves, and sometimes actuate fuel injectors at precise timings for each of a plurality of engine cylinders. Most engines so equipped utilize one or more journal bearings to rotationally support the camshaft during rotation, and a pair of thrust bearing surfaces to limit movement of the camshaft along its axis of rotation. In some instances, such as that taught in U.S. Pat. No. 6,786,643, the camshaft includes an integrally formed disc that is trapped within a slot defined by the engine housing to prevent the camshaft from moving beyond where the disc contacts the side walls of the slot during normal engine operation. In other instances, the camshaft itself might define an annular groove that receives a protrusion defined by the engine housing that prevents movement of the camshaft along its axis of rotation by interaction between the housing protrusion and the side walls of the annular slot defined by the camshaft. In still another strategy, taught in U.S. Pat. No. 5,826,461, a first thrust bearing surface may be located on one side of a disc integrally formed on a collar that is interference fit on the outside of the camshaft, and an opposite thrust bearing surface is located on an adjacent inner surface of a cam gear mounted to one end of the camshaft. The two thrust bearing surfaces define an annular slot that receives a portion of the engine housing, thus preventing movement of the camshaft beyond where the thrust bearing surfaces contact their counterpart thrust surfaces of the engine housing. While these and likely other thrust bearing strategies are known and available, they often suffer drawbacks associated with manufacturing complexity, cost, extra components, and even sometimes undesirable weakening of the camshaft in order to accommodate thrust bearing surfaces.

In another aspect of engine design, it is well known that many moving parts in and on the engine need continuous lubrication in order for the engine to function properly for an expected working life. In typical situations, a lubrication pump circulates lubrication oil to a number of engine galleries, that in turn supply individual lubrication jets associated with lifters, pistons, connecting rods, crank bearings, cam bearings, etc. Because these lubrication galleries are sometimes arranged in parallel, and because the lubricating demands associated with different lubrication galleries may not be equal, it is possible that excess lubrication fluid may flow to and through one lubrication gallery leaving a deficit, and potentially less than adequate lubrication, for the components associated with a different lubrication gallery. Finding strategies to insure that all of the lubrication galleries receive an adequate supply of lubricating oil can sometimes be problematic and elusive.

The present disclosure is directed to one or more of the problems set forth above.

SUMMARY OF THE DISCLOSURE

In one aspect, an engine includes a camshaft supported in a housing for rotation about an axis of rotation. A cam gear is attached to one end of the camshaft and includes a first thrust bearing surface. A thrust ring is attached to the cam gear and includes a second thrust bearing surface. A thrust ring retainer is attached to the housing with a plurality of bolts and includes a pair of thrust surfaces trapped between the first thrust bearing surface of the cam gear and a second thrust bearing surface of the thrust ring.

In another aspect, a camshaft/cam gear assembly includes a cam shaft that defines a first array of threaded fastener bores at one end distributed around an axis of rotation. A cam gear is in contact with the one end and defines a first array of fastener bores in register with the first array of threaded fastener bores. The cam gear also includes a second array of fastener bores. The camshaft is attached to the cam gear by a first group of threaded fasteners received through the first array of fastener bores and threaded into the first array of threaded fastener bores. A thrust ring is in contact with the cam gear and defines a shaft bore and a second array of fastener bores in register with the second array of fastener bores of the cam gear. The one end of the camshaft is received through the shaft bore. The thrust ring is attached to the cam gear by a second group of fasteners received in the second array of fastener bores of the cam gear and the second array or fastener bores of the thrust ring. The cam gear includes a first thrust bearing surface, and the thrust ring includes a second thrust bearing surface oriented in opposition to the first thrust bearing surface.

In still another aspect, a cam gear drives rotation of a camshaft about an axis of rotation. Movement of the camshaft in a first direction along the axis of rotation is limited by contact between a first thrust surface of a thrust ring retainer and a first thrust bearing surface of the cam gear. Movement of the camshaft in a second opposite direction along the axis of rotation is limited by contacting a second thrust surface of the thrust ring retainer with a second thrust bearing surface of the thrust ring.

DETAILED DESCRIPTION

Figure 1:
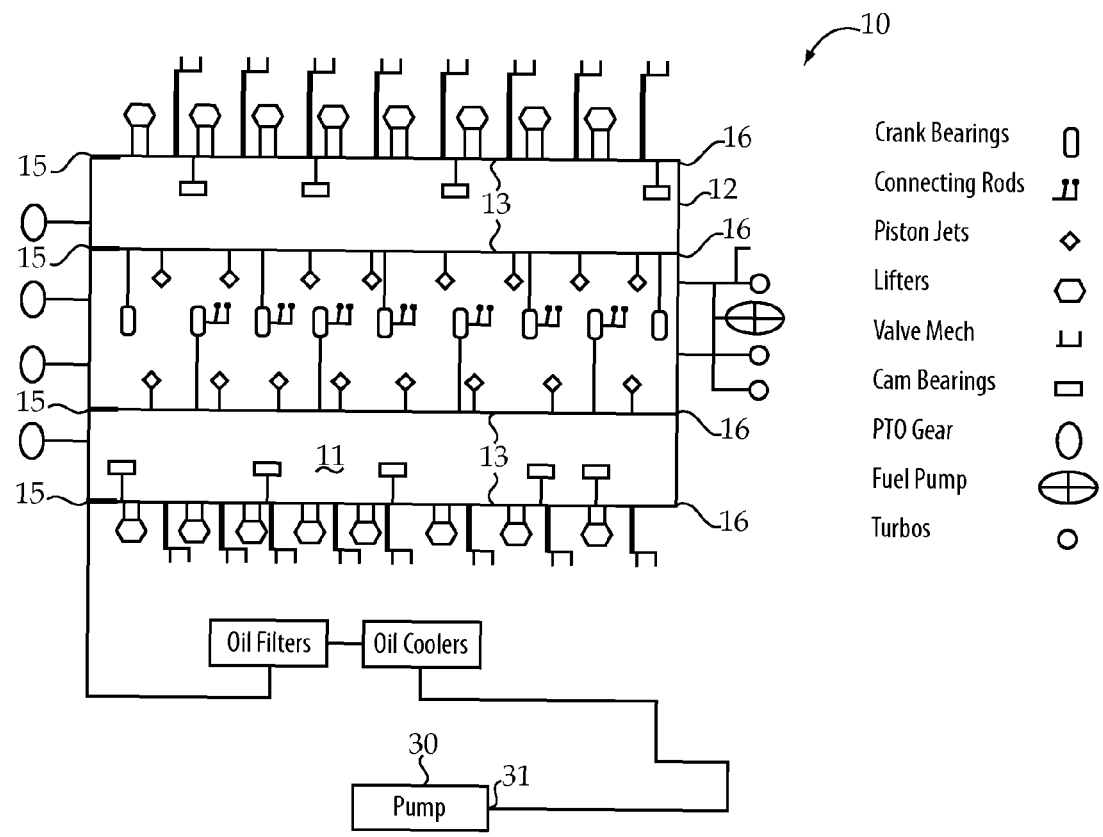
FIG. 1 is a lubricating oil system schematic for an engine according to one aspect of the present disclosure.
Figure 2:
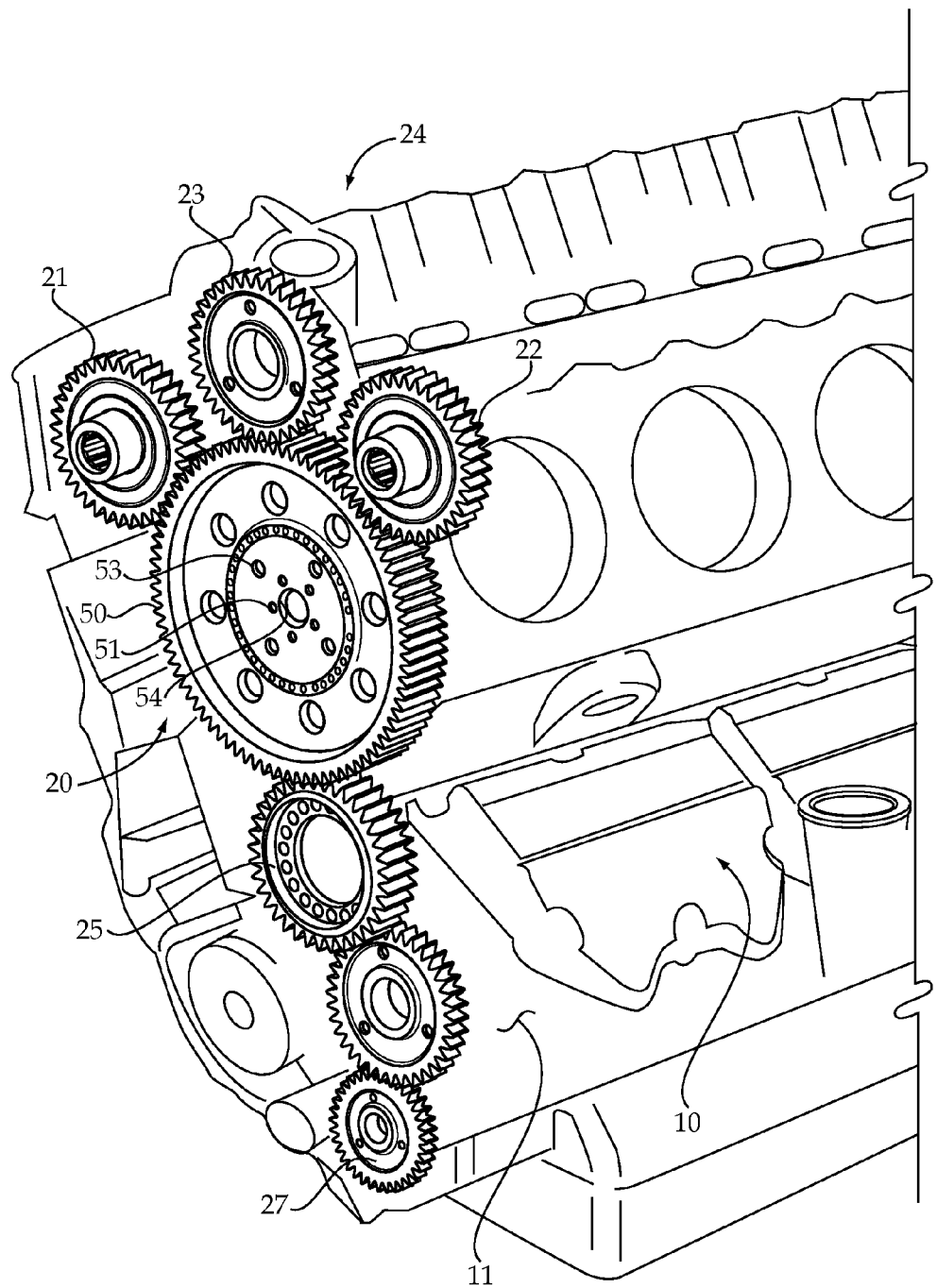
FIG. 2 is a perspective diagrammatic view of a geartrain for the engine of FIG. 1.

Referring to FIGS. 1 and 2, an engine 10 according to one aspect of the present disclosure may include a housing that defines a plurality of oil galleries 13. In the illustrated embodiment, four lubrication oil galleries 13 are arranged in parallel around a camshaft (see infra), and each include an inlet port 15 fluidly connected to receive lubrication oil pumped from an outlet 31 of a lubrication pump 30. Each of the lubrication galleries 13 also includes an opposite port 16 that open into, and are fluidly connected to one another via, a lubrication connection passage 12. Together, the lubrication galleries 13 provide lubricating oil to various moving components of engine 10 including crank bearings, connecting rods, piston jets, lifters and cam bearings as per the schematic of FIG. 1.

In another aspect, engine 10 may include a gear train 20 that includes a crank gear 25 meshed to drive rotation of a cam gear 50 as shown in FIG. 2. A majority of the power transmitted from crank gear 25 to cam gear 50 is transferred to drive rotation of at least one powered gear 24 meshed with cam gear 50, and a minority of that power is transmitted to drive rotation of a cam shaft 40 (see infra) attached to cam gear 50. Engine 10 might be utilized in a large off road machine, such as a track type tractor or mine truck. In such an instance, powered gears 24 might include first and second PTO gears 21 and 22 that drive rotation of hydraulic pumps to provide pressurized hydraulic fluid to the implements of the machine. In addition, the powered gears 24 might include a common rail fuel pump gear 23 to pressurize fuel to relatively high levels for injection into various cylinders of engine 10 for compression ignition in a known manner. Gear train 20 might also include an oil pump gear 27 that also receives power from crank gear 25 via an oil pump idler gear in order to power lubrication pump 30 shown in FIG. 1.

Figure 3:
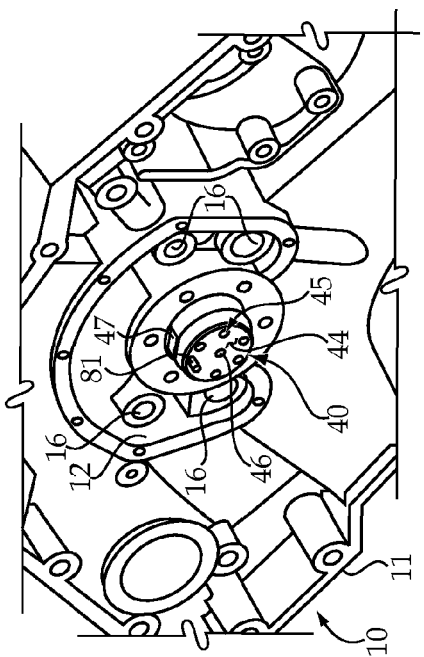
FIG. 3 is a perspective view of the engine of FIG. 1 during manufacture showing an exposed end of the camshaft.

Referring now specifically to FIGS. 3-6, a series of perspective views show the various components that make up a cam shaft/cam gear assembly 35 according to the present disclosure. In particular, FIG. 3 shows an exposed one end 44 of a cam shaft 40 mounted for rotation in housing 11 of engine 10. FIG. 3 also shows the opposite ports 16 of the lubrication galleries opening into a lubrication connection passage 12 defined by housing 11 that acts as the lubrication connection passage 12 identified with regard to FIG. 1. The one end 44 of cam shaft 40 defines a central threaded bore 46, and a first array of six threaded fastener bores 45 that surround central threaded bore 46. Cam shaft 40 also includes assembly alignment features including an alignment flat surface 47 and a hole that receives one end of an alignment dowel 81.

Figure 4:
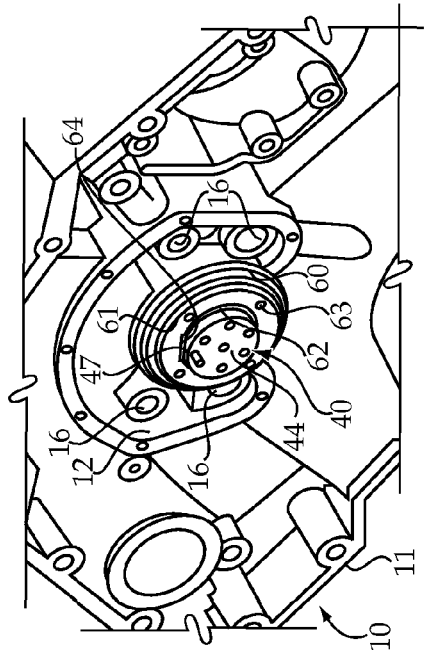
FIG. 4 is a perspective view similar to FIG. 3 except after thrust ring according to the present disclosure has received one end of the camshaft.
Figure 6:
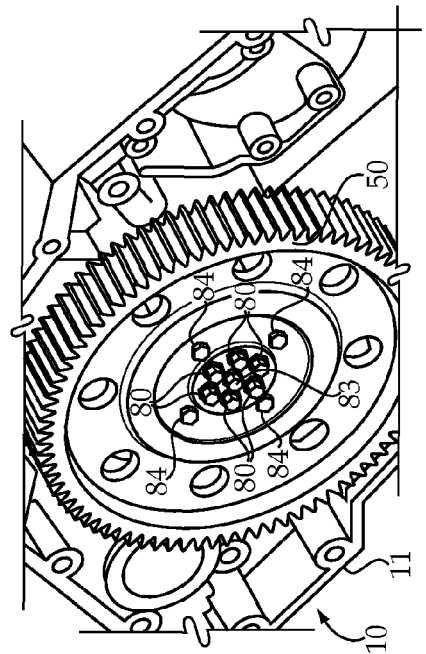
FIG. 6 is a perspective view of the engine of FIGS. 3-5 after the cam gear has been attached to the camshaft and thrust ring.
Figure 5:
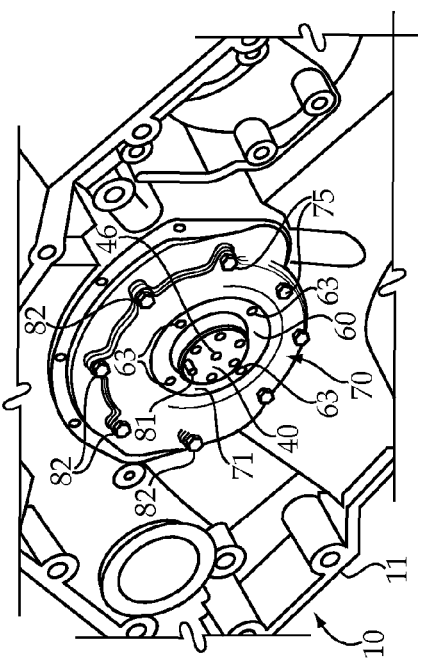
FIG. 5 is a perspective view of the engine of FIGS. 3 and 4 after a thrust ring retainer has been attached to the engine housing.

FIG. 4 shows further progress in the assembly of the cam shaft/cam gear assembly 35 by the one end 44 of cam shaft 40 receiving a thrust ring 60 through a shaft bore 62 that is partially defined by a flat segment 64 positioned over the alignment flat surface 47 of cam shaft 40. Thrust ring 60 includes a second array of four threaded fastener bores 63 and includes a thrust bearing surface 61, which has an annular shape that surrounds cam shaft 40. FIG. 5 shows the assembly after thrust ring retainer 70 has been attached to engine housing 11 by an array of bolts 82. Thrust ring retainer 70 may include a planar surface 74 oriented away from cam gear 50 and in contact with housing 11. Thrust ring retainer 70 and housing 11 define the lubrication passage connection passage 12 among the lubrication galleries 13. In addition, thrust ring retainer includes an annular shaped thrust surface 72 (FIG. 7) that is positioned to contact thrust bearing surface 61 of the thrust ring 60. The thrust ring retainer 70 defines a third array of fastener bores 75 that receive bolts 82 that are in turn threaded into threaded bores defined by housing 11. Planar surface 74 may engage in sealing contact around the peripheral edge to better facilitate fluid connection and pressure equalization among the four lubrication galleries 13 at opposite ports 16. FIG. 6 shows assembly 35 after cam gear 50 has been attached to both cam shaft 40 and thrust ring 60.

Figure 7:
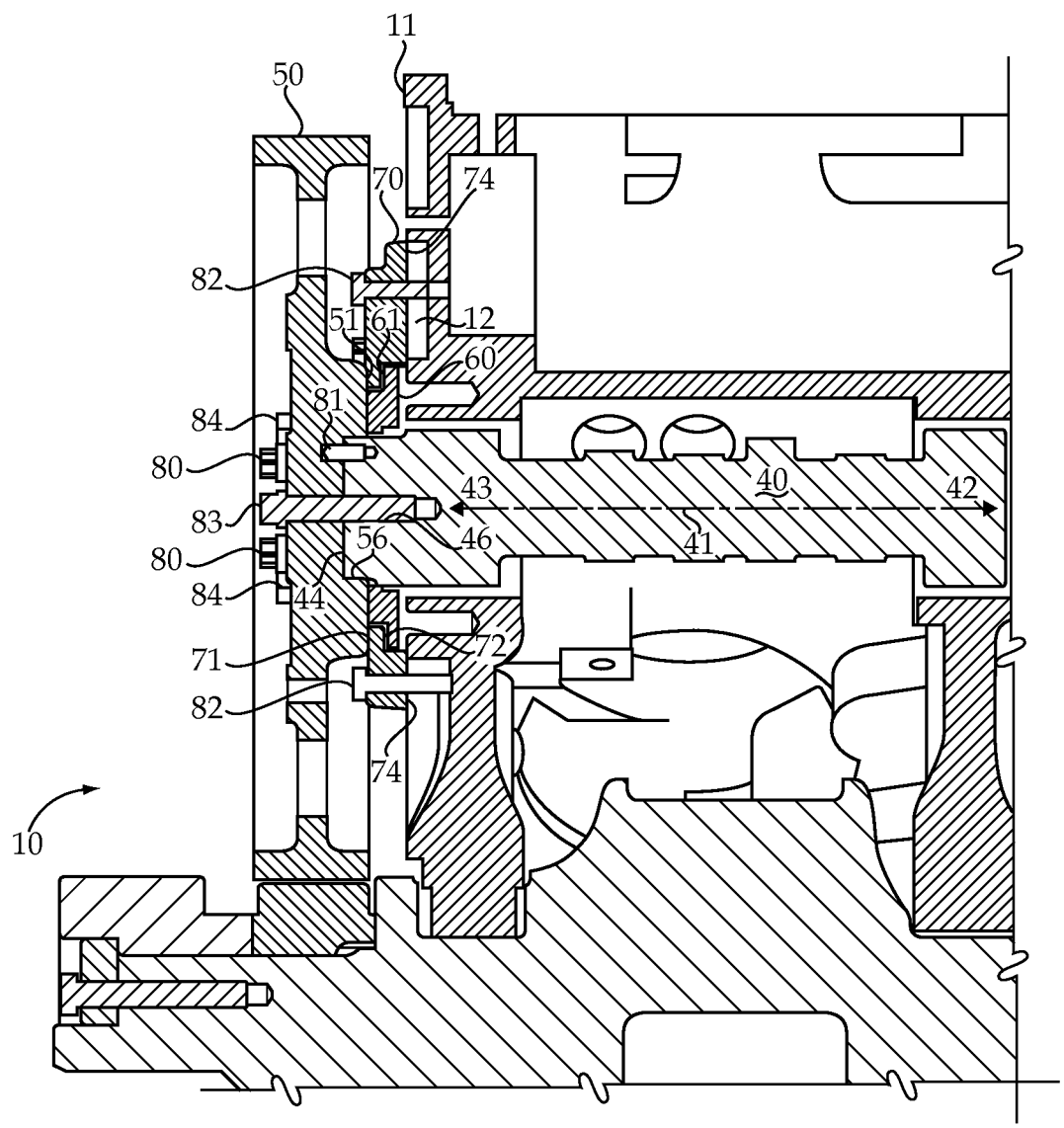
FIG. 7 is a partial side sectioned view through the cam gear, camshaft and engine housing of the engine of FIGS. 1-6.

The cam gear 50 defines a first central bore 54 that is surrounded by a first array of fastener bores 52 in register with the first array of threaded fastener bores 45 due to the inclusion of a dowel alignment bore that receives an opposite end of dowel 81 shown in FIGS. 3-5 and 7. Cam gear 50 is attached to the thrust ring 60 via four fastener bolts 84 that are received through an array of fastener bores 53 and threaded into fastener bore 63 of thrust ring 60. The interaction of flat segment 64 with alignment flat surface 47 ensures alignment between bores 53 and 63. Cam gear 50 includes a counterbore 56 that receives one end 44 of cam shaft 40 in an interference fit as shown in FIG. 7. In order to facilitate this attachment, a central bolt 83 is received through central bore 54 of cam gear 50 and threaded into central threaded bore 46 of cam shaft 40. The axis of rotation 41 may be aligned with central threaded bore 46 and central bore 54. By tightening the central bolt 83, cam gear 50 can be pulled into attachment position with the interference fit of counterbore 56 as best shown in FIG. 7. After being properly positioned, the cam gear 50 may be securely attached to cam shaft 40 via a second group of six fastener bolts 80 received through fastener bores 52 of cam gear 50 and threaded into counterpart threaded bores 45 defined by cam shaft 40. After the attachment is complete, FIG. 7 shows that first and second thrust surfaces 71 and 72 of thrust ring retainer are trapped between a first thrust bearing surface 51 defined on one face of cam gear 50 and a second thrust bearing surface 61 defined by thrust ring 60. Thus, the interaction between thrust surface 71 and thrust bearing surface 51 limit movement of cam shaft 40 in a first direction 42 along axis of rotation 41. And, the interaction between second thrust surface 72 with bearing thrust bearing surface 61 inhibits movement of cam shaft 40 in an opposite direction 43.

INDUSTRIAL APPLICABILITY

The present disclosure is potentially applicable to any engine that includes a cam shaft 40 attached to a cam gear 50. Furthermore, the present disclosure is potentially applicable to an engine that includes a plurality of lubrication galleries in potential need of pressure equalization via a lubrication connection passage that facilitates fluid connection among opposite ports of the lubrication galleries 13. Finally, the present disclosure is potentially applicable to engines that include a gear train in which a crank gear 25 transmits power to a cam gear 50, which in turn transfers a majority of that power to a plurality of pump gears 21-23, and a minority of that power to drive rotation of an underlying cam shaft 40.

The thrust strategy of the present disclosure allows for eliminating a potential thrust groove in the cam shaft in order to increase the diameter of the cam shaft at the one end 44 to a cam journal size associated with the other cam rotation bearings. In addition, the cam shaft shoulder may be increased to improve potential bolt fatigue where the cam shaft 40 receives the bolts for attachment to cam gear 50. By splitting the cam gear hub into two pieces (cam gear 50 and thrust ring 60), the thrust surfaces defined by the thrust ring retainer 70 are captured or trapped inside the gear hub, and more particularly trapped between bearing surface 51 and 61. Finally, the thrust ring retainer may do double duty by defining a portion of a lubrication connection passage that allows for pressure equalization among the lubrication galleries 13. Thus, in the event that oil pressure is not evenly distributed among the oil galleries 13 due to different fluid restrictions, some of the excess lubrication fluid from one of the galleries can flow into another one of the lubrication galleries 13 via the lubrication connection passage 12 defined by engine housing 11 and thrust ring retainer 70. This strategy also permits elimination of plugs that might otherwise be utilized to close the opposite ends 16 of each of the different lubrication galleries 13.

By utilizing a cam gear interference fit to the cam shaft 40, a central bolt 83 can be utilized to draw the cam shaft 40 into the counterbore 56 of cam gear 50 in a tighter interference fit. By utilizing an alignment dowel 81 and an alignment flat surface 47, the various fastener bores can be in register with one another so that the various bolts can be threaded blindly in from outside of cam gear 50 as best shown in FIG. 6.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An engine comprising:
   a housing;
   a camshaft supported in the housing for rotation about an axis of rotation;
   a cam gear attached to one end of the cam shaft and including a first thrust bearing surface;
   a thrust ring attached to the cam gear and including a second thrust bearing surface; and
   a thrust ring retainer attached to the housing with a plurality of bolts and including a pair of thrust surfaces trapped between the first thrust bearing surface of the cam gear and the second thrust bearing surface of the thrust ring,
   wherein the thrust ring retainer and the housing define a lubrication connection passage among a plurality of lubrication galleries defined by the housing.

2. The engine of claim 1 wherein the plurality of lubrication galleries includes four lubrication galleries that are fluidly positioned between inlet ports and opposite ports;
   the opposite ports open into the lubrication connection passage; and the engine further comprising;
   a lubrication pump with an outlet fluidly connected to the inlet ports.

3. The engine of claim 2 wherein the camshaft defines a first array of threaded fastener bores at one end distributed around the axis of rotation;
   the cam gear being in contact with the one end and defining a first array of fastener bores in register with the first array of threaded fastener bores, and also including a second array of fastener bores;
   the cam shaft being attached to the cam gear by a first group of threaded fasteners received through the first array of fastener bores and threaded into the first array of threaded fastener bores;
   the thrust ring being in contact with the cam gear and defining a shaft bore and a second array of fastener bores in register with the second array of fastener bores of the cam gear;
   the one end of the cam shaft being received through the shaft bore; and
   the thrust ring being attached to the cam gear by a second group of fasteners received in the second array of fastener bores of the cam gear and the second array of fastener bores of the thrust ring.

4. The engine of claim 3 wherein the thrust ring retainer includes a planar surface oriented away from the cam gear in contact with the housing, and defining a third array of fastener bores that receive the plurality of bolts.

5. The engine of claim 4 further comprising an alignment dowel partially positioned in each of the camshaft and the cam gear; and
   wherein the shaft bore of the thrust plate is partially defined by a flat segment positioned over an alignment flat surface of the cam shaft.

6. The engine of claim 5 wherein the one end of the cam shaft is received in an interference fit into a counter bore defined by the cam gear;
   the cam shaft defines a central threaded bore aligned with the axis of rotation;
   the cam gear defines a central bore aligned with the axis of rotation; and
   a central bolt received through the central bore and threaded into the central threaded bore.

7. The engine of claim 6 wherein the cam gear is a portion of a gear train that includes a crank gear meshed with the cam gear, and at least one powered gear meshed with the cam gear.

8. The engine of claim 7 wherein a majority of power transmitted from the crank gear to the cam gear is transferred to the at least one powered gear, and a minority of the power is transferred to rotate the cam shaft.

9. The engine of claim 8 wherein the at least one powered gear includes a first, second and third pump gears.

10. A camshaft/cam gear assembly comprising:
    a camshaft defining a first array of threaded fastener bores at one end distributed around an axis of rotation;
    a cam gear in contact with the one end and defining a first array of fastener bores in register with the first array of threaded fastener bores, and also including a second array of fastener bores;
    the cam shaft being attached to the cam gear by a first group of threaded fasteners received through the first array of fastener bores and threaded into the first array of threaded fastener bores;
    a thrust ring in contact with the cam gear and defining a shaft bore and a second array of fastener bores in register with the second array of fastener bores of the cam gear;
    the one end of the cam shaft being received through the shaft bore;
    the thrust ring being attached to the cam gear by a second group of fasteners received in the second array of fastener bores of the cam gear and the second array of fastener bores of the thrust ring;
    the cam gear including a first thrust bearing surface, and the thrust ring including a second thrust bearing surface oriented in opposition to the first thrust bearing surface.

11. The camshaft/cam gear assembly of claim 10 further comprising a thrust ring retainer trapped between the first thrust bearing surface and the second thrust bearing surface, and including a planar surface oriented away from the cam gear, and defining a third array of fastener bores.

12. The camshaft/cam gear assembly of claim 11 further comprising an alignment dowel partially positioned in each of the camshaft and the cam gear; and
    wherein the cam bore of the thrust ring is partially defined by a flat segment positioned over an alignment flat surface of the cam shaft.

13. The camshaft/cam gear assembly of claim 12 wherein the one end of the cam shaft is received in an interference fit into a counter bore defined by the cam gear;
    the cam shaft defines a central threaded bore aligned with the axis of rotation;
    the cam gear defines a central bore aligned with the axis of rotation; and
    a central bolt received through the central bore and threaded into the central threaded bore.

14. A method of operating an engine that includes a camshaft supported in a housing for rotation about an axis of rotation; a cam gear attached to one end of the cam shaft and including a first thrust bearing surface; a thrust ring attached to the cam gear and including a second thrust bearing surface; and a thrust ring retainer attached to the housing with a plurality of bolts and including a pair of thrust surfaces trapped between the first thrust bearing surface of the cam gear and the second thrust bearing surface of the thrust ring, the method comprising:

driving rotation of the camshaft about the axis of rotation with the cam gear;

limiting movement of the camshaft in a first direction along the axis of rotation by contacting a first thrust surface of the pair of thrust surfaces with the first thrust bearing surface of the cam gear; and limiting movement of the camshaft in a second direction, which is opposite the first direction, along the axis of rotation by contacting a second thrust surface of the pair of thrust surfaces with the second thrust bearing surface of the thrust ring.

15. The method of claim 14 further comprising pumping lubrication fluid into inlet ports of a plurality of lubrication galleries; and fluidly connecting opposite ports of the plurality of lubrication galleries with a connection passage defined by the thrust ring retainer and the housing.

16. The method of claim 15 wherein the pumping step includes pumping lubrication fluid into inlet ports of four lubrication galleries; and the fluidly connecting step includes equalizing pressure at the opposite ports of the four lubrication galleries.

17. The method of claim 16 further comprising driving rotation of the cam gear with a meshed crank gear; and driving rotation of at least one powered gear meshed with the cam gear.

18. The method of claim 17 further comprising transmitting power from the crank gear to the cam gear;

transferring a majority of the power to the at least one powered gear; and transferring a minority of the power to the camshaft.

19. The method of claim 18 further comprising powering a plurality of pumps with the at least one powered gear.

* * * * *